US008611646B1

(12) United States Patent
Patrick

(10) Patent No.: US 8,611,646 B1
(45) Date of Patent: Dec. 17, 2013

(54) COMPOSITION OF TEXT AND TRANSLUCENT GRAPHICAL COMPONENTS OVER A BACKGROUND

(75) Inventor: Alastair Patrick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 631 days.

(21) Appl. No.: 12/717,556

(22) Filed: Mar. 4, 2010

(51) Int. Cl.
*G06K 9/00* (2006.01)
*G09G 5/00* (2006.01)

(52) U.S. Cl.
USPC .......................................... 382/162; 345/611

(58) Field of Classification Search
USPC .......... 382/162, 167, 299; 345/639, 592, 589, 345/569; 715/768, 803; 701/208
See application file for complete search history.

(56) References Cited

U.S. PATENT DOCUMENTS

| | | | | |
|---|---|---|---|---|
| 5,940,080 | A * | 8/1999 | Ruehle et al. | 345/611 |
| 8,005,613 | B2 * | 8/2011 | Rasmussen et al. | 701/461 |
| 8,120,623 | B2 * | 2/2012 | Lee et al. | 345/639 |
| 2005/0212820 | A1 * | 9/2005 | Liu et al. | 345/620 |
| 2010/0141670 | A1 * | 6/2010 | Cohen et al. | 345/589 |

OTHER PUBLICATIONS

Haase, Chet, "*Intermediate Images*," Java 2D, Sep. 2004, 6 pages, (website—http://java.sun.com/developer.technicalArticles/Media/intimages/).
Lovitt, Michael, "*Cross-Browser Variable Opacity with PNG: A Real Solution*," A List Apart: Articles, Dec. 21, 2002, No. 156, 7 pages, (website—http://www.alistapart.com/articles/png).
Antisaliasing and Transparency Tutorial, "Understanding Antialiasing and Transparency," copyright 2004, http://lunaloca.com/tutorials/antialiasing/, downloaded Jun. 13, 2013, 6 pages.

* cited by examiner

*Primary Examiner* — Andrae S Allison
(74) *Attorney, Agent, or Firm* — Sterne, Kessler, Goldstein & Fox P.L.L.C.

(57) ABSTRACT

The present invention relates to methods and apparatus for the composition of text and translucent graphical components over a background. A compositor includes a color analyzer and a color selector. The color analyzer analyzes the colors of a graphical component and the color selector selects two or more colors over each of which the graphical component is rendered. A shader then completes the rendering of the graphical component by performing linear interpolations on the graphical component color, the background colors and a received background color.

21 Claims, 12 Drawing Sheets

COMPOSITION OF TEXT AND TRANSLUCENT GRAPHICAL COMPONENTS OVER A BACKGROUND

FIELD

The field generally relates to displaying of text and graphical components.

BACKGROUND

Modern personal computers use complex graphical systems, with display tasks often being performed both by a central processing unit (CPU) and a graphical processing unit (GPU). While basic display tasks may be performed by the CPU, more complex graphical operations may be performed by the GPU with increased performance. Legacy applications however, such as the Netscape Plug-In Application Program Interface (NPAPI) may not be able to fully utilize the advanced graphics capabilities of the GPU. When the NPAPI is used in a modern web browser that uses a GPU to composite pages, such as GOGGLE CHROME, from Google Inc. of Mountain View, Calif., decreased performance can occur. When using the NPAPI to display translucent graphical objects that are displayed in a web-browser plug-in, the CPU must generally be supplied with a known background before rendering can occur. This requirement that the CPU wait for a background before rendering may cause latency in the display of certain graphical objects.

Another performance issue that can arise relating to CPU and GPU rendering involves the rendering of sub-pixel anti-aliased (SPAA) text over an unknown background. As with the display of plug-ins above, under traditional methods, SPAA text must be rendered over a known background, wherein if the background is not available SPAA processing can stall until the background is provided.

Accordingly, what is needed are new methods and apparatus for the composition of translucent graphical components and SPAA text over a background.

BRIEF SUMMARY

Embodiments described herein relate to methods and apparatus for the composition of text and translucent graphical components over a background. According to an embodiment, computer-implemented method of displaying a graphical component is provided. The method includes analyzing the graphical component, wherein at the time of the analyzing, a background over which the graphical component is to be displayed is unknown. The method further includes creating a first and second version of the graphical component based on the analyzing; and receiving an indication of the background over which the graphical component is to be displayed. The method further includes creating a third version of the graphical component based on the first version of the graphical component, the second version of the graphical component and the background. Finally, the method displays the third version of the graphical component over the background.

According to another embodiment, a graphical component processor apparatus for compositing a graphical component over a background includes a color analyzer that receives and analyzes the graphical component, wherein at the time of the analyzing, the background over which the graphical component is to be displayed is unknown, and a color selector that selects a first color and a second color based on the analyzing of the graphical component. The graphical component processor further includes a central processing unit (CPU) that receives the first color, the second color and the graphical component. The central processing unit renders a first version of the graphical component using the first color, and a second version of the graphical component using the second color. Upon the availability of a background over which the graphical component is to be composited, a graphical processing unit (GPU) composites the graphical component using the first version of the graphical component, the second version of the graphical component and the background.

Further features and advantages, as well as the structure and operation of various embodiments are described in detail below with reference to the accompanying drawings.

BRIEF DESCRIPTION OF THE FIGURES

Embodiments herein are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Overview

Figure 1:
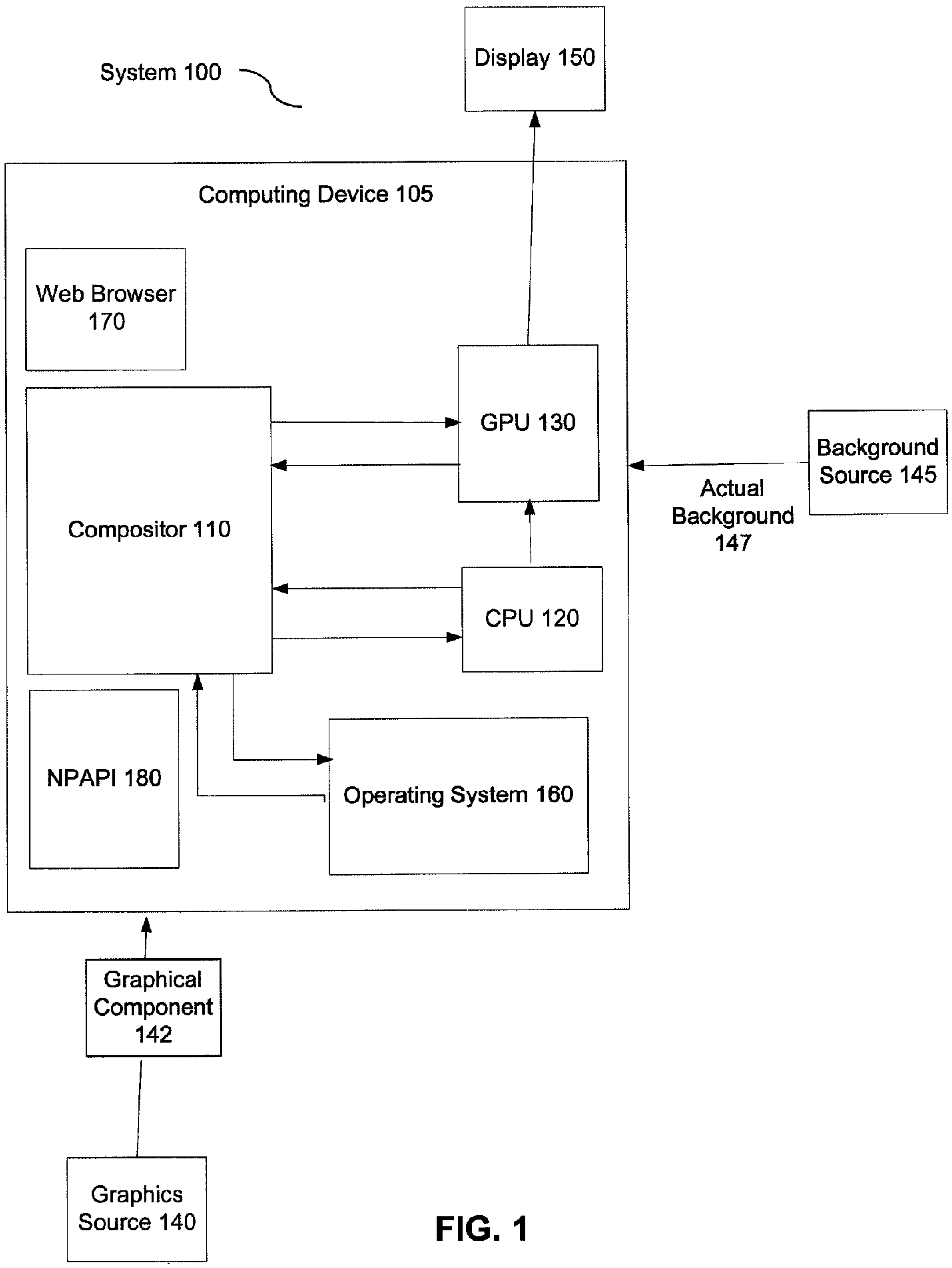
FIG. 1 is a diagram of a system according to an embodiment.

I. Translucent Graphical Components in a Web Browser
- System 100
  - Color Analysis and Selection
  - Linear Interpolation
  - Background Available II. Sub-Pixel Anti-aliased Text
  - Color Analysis and Selection
  - CPU 120
  - Normalization
- GPU shader 310
  - First Linear Interpolation
  - Second Linear Interpolation
- Translucent SPAA Text -continued

| Overview | |
|---|---|
| III. | Example Computer System Implementation |
| IV. | Conclusion |

Overview

Embodiments described herein relate to the composition of text and translucent graphical components over a background. Different approaches are described that allow embodiments, for example, to composite text and translucent graphical components over a background that is unknown at the time of the compositing.

While specific configurations, arrangements, and steps are discussed, it should be understood that this is done for illustrative purposes only. As would be apparent to a person skilled in the art given this description, other configurations, arrangements, and steps may be used without departing from the spirit and scope of the present invention. As would be apparent to a person skilled in the art given this description, that these embodiments may also be employed in a variety of other applications.

It should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art given this description to incorporate such a feature, structure, or characteristic in connection with other embodiments whether or not explicitly described.

I. TRANSLUCENT GRAPHICAL COMPONENTS IN A WEB BROWSER

Web pages may be composed of overlapping elements. Some of the elements that comprise a web page may be translucent. For certain modem web browsers, for example the GOOGLE CHROME browser, it is desirable to use graphics processing unit (GPU) to composite the layers of a web page. This is because a GPU can perform the compositing task with less latency than a central processing unit (CPU). In addition, because a GPU can typically composite layers of a web page with higher throughput, the GPU can also be relatively more power efficient, which is important for applications executed on laptop and netbook computers.

NPAPI is an API that is commonly used to create plug-ins for virtually all web browsers. Released in the 1990s, this plug-in API is commonly referred to as a "legacy" API, meaning it is an older API that still continues to be used, even though newer technology or more efficient methods are now available. One problem associated with legacy APIs is that they often were designed before modem technological advances were developed. For example, a NPAPI generally cannot use a GPU to render and composite plug-ins for display.

When the web browser requires an NPAPI plug-in to render itself for example, a web browser invokes a callback to NPAPI, passing a device context (DC). This device context (DC) is platform dependent, and is used to define the attributes of text and images that are output to the screen. When the NPAPI uses the received DC, it can determine the background upon which the plug-in is to be rendered.

Through this device context, the plug-in using NPAPI can make regular calls to an operating system to render itself. For example, to achieve the effect of translucency, when rendering a translucent plug-in, a NPAPI can read back information from the device context to discover the colors of the pixels that have already been rendered for layers beneath it. Components that could have already been rendered underneath the plug-in include regular HTML elements or other plug-in instances. In GOOGLE CHROME for example, these components may have been rendered and composited using a GPU.

In MICROSOFT WINDOWS from Microsoft Corp. of Redmond, Wash., for example, the DC used to service requests from a NPAPI is a Handle to the Device Context (HDC) in Microsoft Graphics Device Interface (GDI). The NPAPI uses these GDI calls to determine the current background below the plug-in for rendering.

For modem web browsers that composite pages using GPU, the NPAPI approach to rendering plug-ins is a less efficient design because the plug-in must be rendered on the CPU before being later composited with other layers by a GPU. That is, the translucent plug-in cannot be rendered before the colors of the layers beneath it are known. With an unknown background, when NPAPI 180 attempts to read back the existing background pixels in order to render the plug-in with a translucent effect, the rendering stalls because the pixels are not yet available.

Because plug-ins use a variety of third party code, it is generally not possible to modify the plug-in to bypass the above noted approach. For modem web browsers therefore, a different approach to rendering plug-in graphics is needed, such approach working within the existing NPAPI rendering structure.

System 100

FIG. 1 illustrates a system 100 according to an embodiment. System 100 comprises computing device 105, display 150, background source 145 and graphics source 140. Computing device 105 includes components such as compositor 110, graphics processing unit (GPU) 130 and central processing unit (CPU) 120. Computing Device 105 can also include an operating system 160, web browser 170 and NPAPI 180. Graphics source 140 is the source of graphical component 142. In an embodiment, compositor 110 can be used to enable the compositing of translucent web browser plug-ins with GPU 130, an example type of plug-in being an NPAPI 180 plug-in.

As used herein, the term "graphical component" is used interchangeably with a plug-in created with a NPAPI. Though embodiments described herein may be described with respect to a NPAPI, the general approaches of embodiments may be applied to any graphical component displayed in similar circumstances. The term NPAPI will be used herein to refer generally to a legacy browser plug-in API, specifically one that does not support compositing a plug-in using GPU 130. The NPAPI 180 label is non-limiting and, as would be apparent to a person skilled in the art given this description, other components, modules, APIs, can also share the rendering limitations noted above with reference to NPAPI 180.

Computing device 105 can be any commercially available and well known computer capable of performing the functions described herein, such as computers available from International Business Machines, Apple, Sun, HP, Dell, Compaq, Digital, Cray, etc. Computing device 105 also may be a mobile device or other mobile processing system such as a smartphones, mobile phone or tablet personal computer.

The embodiment of system 100, as depicted on FIG. 1 is a solution to the rendering and compositing of legacy plug-ins with reduced latency. One solution to NPAPI plug-in rendering latency, arrived at by the present Inventor, is to use compositor 110, CPU 120, GPU 130 and operating system 160. In one feature, compositor 110 processes legacy graphical components by receiving graphical component 142 for rendering before the background color upon which graphical component 142 is to be rendered is available from background source 145. In an embodiment, graphical component 142 is a plug-in implemented with NPAPI 180.

Compositor 110 then analyzes the graphical component 142 and selects at least two background colors to use for the rendering of offline bitmaps. Graphical component 142 and the offline bitmaps are analyzed and, when the background becomes available, GPU shader 310 performs a linear interpolation to finalize the rendering, such interpolation combining graphical component 142, the offline bitmaps, and the received background color.

Because a known background is not needed before rendering, embodiments of this approach allow plug-ins to be rendered earlier than traditional approaches. The earlier rendering may lead to increased graphical performance for the plug-in. The specifics of embodiments of this process are described below, along with a comparison to traditional approaches to plug-in rendering.

Color Analysis and Selection

Figure 2:
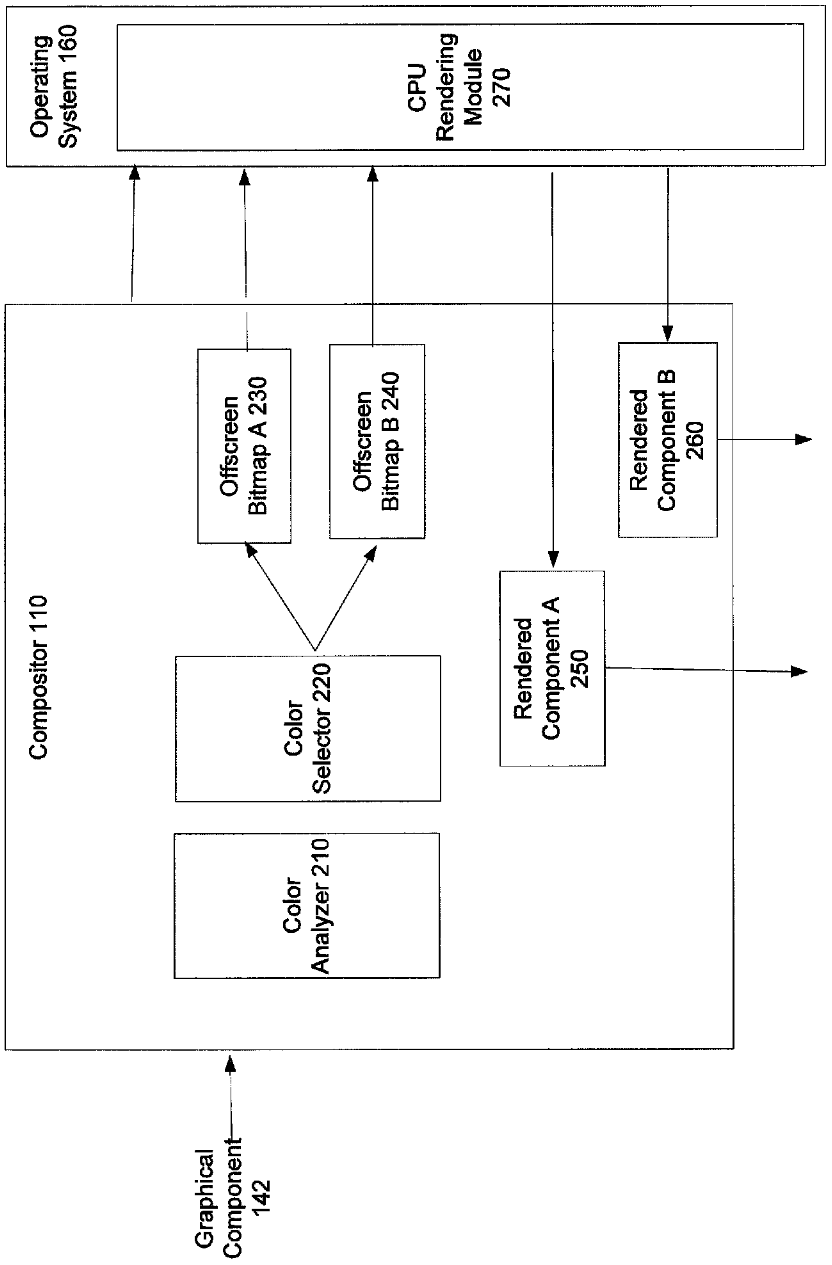
FIG. 2 is a diagram of a compositor according to an embodiment.

FIG. 2 depicts a more detailed version of compositor 110, according to an embodiment. In an embodiment, compositor 110 includes a color analyzer 210, a color selector 220, off-screen bitmaps A 230 and B 240, rendered component A 250 and B 250. Compositor 110 is coupled to operating system 160, such operating system containing a CPU rendering module 270.

Figure 4:
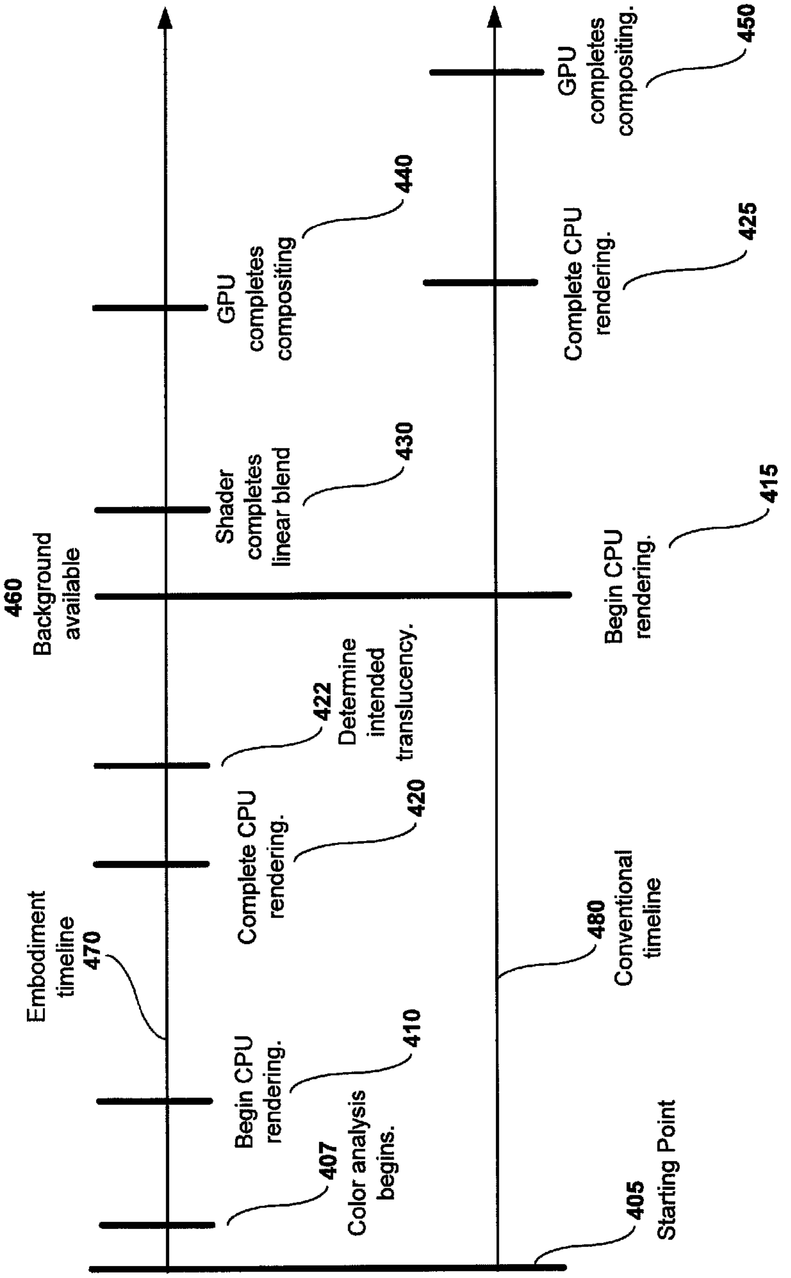
FIG. 4 is a timeline showing events associated with graphical rendering according to an embodiment.

FIG. 4 depicts two timelines showing example events according to an embodiment. Timeline 470 depicts events that follow the processes used by embodiments, and timeline 480 depicts events according to a traditional/legacy graphical component API, e.g., NPAPI 180. Comparing the occurrence of various aspects of the graphical component compositing process shown on FIG. 4, helps to illustrate the features of embodiments described herein. The event placement, duration, and sequence noted on FIG. 4 are not intended to be limiting, rather they are meant to generally describe the operation of an embodiment and the related sequences of events.

Both timelines (470, 480) start at point 405 with a request by web browser 170 to the NPAPI 180 to render graphical component 142. Upon receipt of a graphical component 142, in embodiments, color analyzer 210 analyzes the component colors, and color selector 220 selects colors with which to render offscreen versions of graphical component 142, as shown at point 407 on FIG. 4. These background colors may or may not be selected based on the color of pixels in the graphical component. In embodiments, the background colors are selected so as to be different from one another. In one example, the background colors are selected so as to be maximally different from one another. As discussed further below, having this difference allows later steps of embodiments disclosed below to have increased accuracy. This increased accuracy may be even more significant when background colors are selected that have a maximum or substantially maximum different from one another.

In an example embodiment, the first color selected is solid black and the second color selected is solid white. In an embodiment, color selector 220 creates an offscreen bitmap for each color, e.g. offscreen bitmaps A 230 and B 240.

A problem can occur with embodiments, if a plug-in display changes in the time period between the rendering with the first background color (Back0) and the second background color (Back1). Embodiments can avoid this problem by not providing the plug-in with any other events between first and second background renders.

Though some embodiments described herein disclose the selection of two colors, and two renderings by the CPU to address the above-noted NPAPI latency, this is non-limiting. Any number of selected colors and renderings can be used by embodiments herein to perform the steps below.

One approach to the processing performed by compositor 110, color analyzer 210 and color selector 220 as used by embodiments, is determined with the equations detailed below. Embodiments use the following variables to implement processes described herein:

CP=A color of a particular pixel of graphical component 142.

T=An intended translucency or alpha coverage of a particular plug-in pixel.

CB=An actual background color.

CD=A determined output color.

In embodiments, the values of variables noted above are between zero (0) and one (1).

In the traditional approach, using the equation below, a plug-in is set to render a pixel with color CP with a translucency T (where T=0 would be completely transparent and T=1 would be completely opaque) over a background color (CB). In this traditional approach, the background color CB is known at the time of plug-in rendering, and the GPU is not used for compositing. As would be apparent to a person skilled in the art given this description, NPAPI 180 could calculate the determined output color CD using the following equation:

$$CD=CP*T+CB*(1-T)$$

This traditional process used by NPAPI 180 to render graphical component 142 by the CPU is shown on FIG. 4 as occurring between points 415 and 425. In an embodiment, once the rendering of graphical component 142 is completed by the CPU (point 425), the rendered graphical component 142 is transferred to the GPU for compositing onto the display page. On conventional timeline 480, this completion occurs at point 450. As would be apparent to a person skilled in the art given this description, CPU 120 does not have the rendering capacity of GPU 130, and point 425 on FIG. 4 may take relatively more time than is depicted.

One aim of some embodiments described herein is to achieve substantially the same result but without knowing the color of the background (CB) (e.g., before point 460 on FIG. 4). Embodiments described herein can complete CPU rendering of the plug-in at point 420 as opposed to point 425 for the traditional approach.

At point 407, color analyzer 210 analyzes the colors of graphical component 142, and color selector 220 selects two or more colors based on this analysis. As noted above, these colors are selected to be maximally different from the color of graphical component 142, and each other. One approach to this color selection used by embodiments uses the following equation:

CP=A color of a particular pixel of graphical component 142.

Back0=A first selected background color.

Back1=A second selected background color.

Variable color values being between zero (0) and one (1).

TABLE #1

| Value | Back0 Calculation | Back1 Calculation |
|---|---|---|
| 0 <= CP < ⅓ | Back0 = (CP + 1)/2 | Back1 = 1 |
| ⅓ <= CP < ⅔ | Back0 = 0 | Back1 = 1 |
| ⅔ <= CP <= 1 | Back0 = 0 | Back1 = CP/2 |

In another embodiment, the first background color (Back0) is always black (0) and the second background color is always white (1). As would be apparent to a person skilled in the art given this description, different approaches exist for selecting colors maximally different from a given pixel color.

In an embodiment, after color selector 220 selects the colors for rendering (point 407 on FIG. 4) and creates off-screen bitmaps A 230 and B 240, compositor 110 sends graphical component 142 to operating system 160, along with the offscreen bitmaps (230, 240), for rendering, as shown at point 410 on FIG. 4. As would be apparent to a person skilled in the art given this description, other techniques exist for performing this rendering function, such as sending graphical component 142 along with values corresponding to the selected colors.

Figure 3:
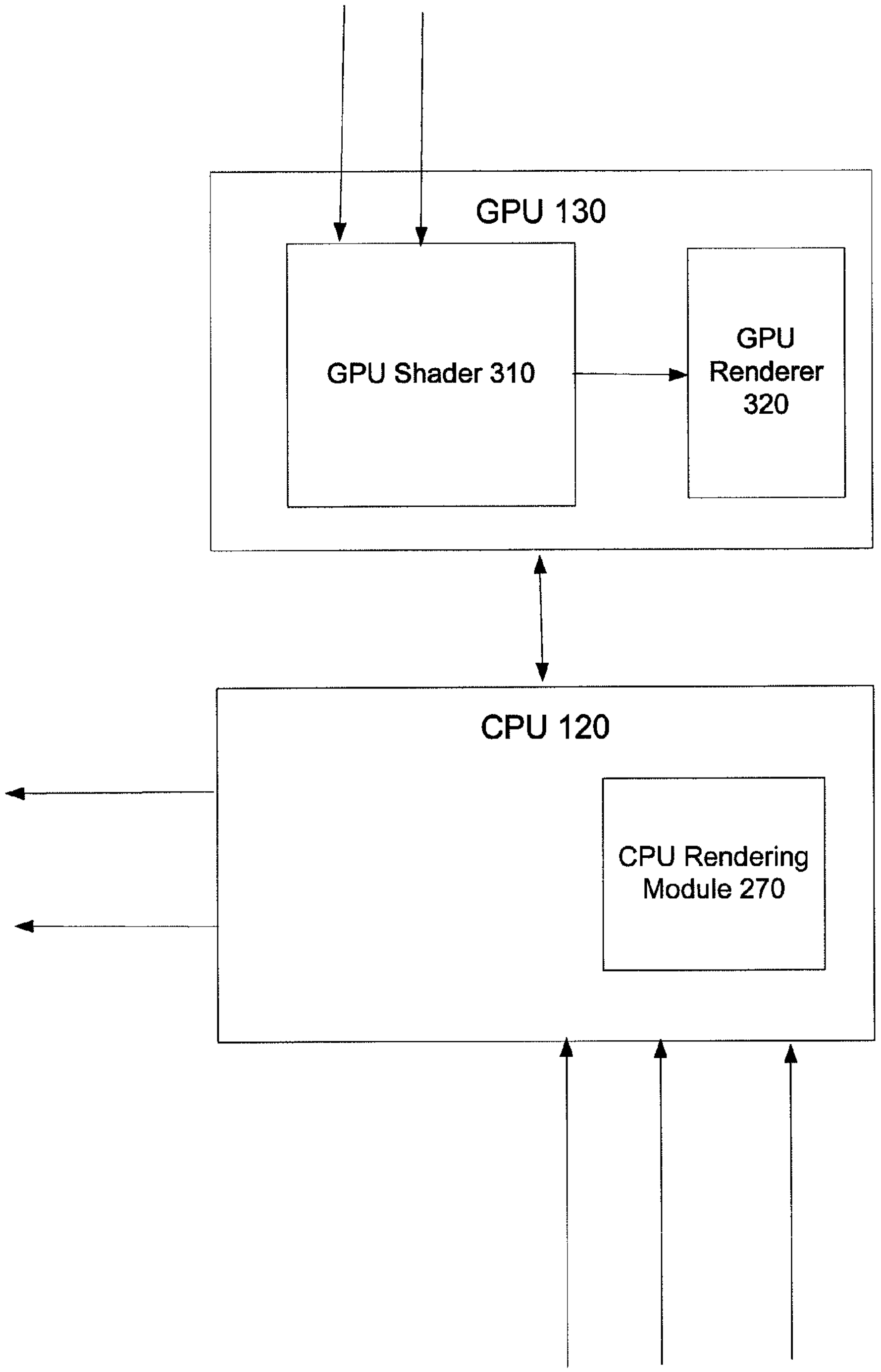
FIG. 3 is a diagram of graphics systems according to an embodiment.

FIG. 3 depicts an embodiment of a graphical display system including GPU 130 coupled to CPU 120. An embodiment includes GPU 130 having GPU shader 310 coupled to GPU renderer 320, and CPU 120 having CPU rendering module 270.

Once graphical component 142 and the two or more off-screen bitmaps (e.g. 230 and 240) are received by operating system 160, operating system 160 renders offline versions of graphical component 142 (as depicted from points 410 to 420 on FIG. 4), returning each version to compositor 110. In embodiments, this rendering is performed by CPU 120 using CPU rendering module 270. It is worth noting that, as shown on FIG. 4, on conventional timeline 480 no rendering has been performed at a comparable point, because the background available point (460) has not occurred.

In an embodiment, once graphical component 142 has been rendered using the selected background colors, as shown at point 420 on FIG. 4, the rendered versions, e.g., rendered component A 250 and rendered component B 250 are sent back to compositor 110 for further processing/routing. In another embodiment, these renditions are sent directly to another component, e.g., GPU 130 for further processing.

Linear Interpolation

In embodiments, when graphical component 142 is to be composited on the GPU 130, both renditions of the plug-in (250, 260) are supplied as textures. In embodiments, a pixel shader, e.g., GPU shader 310, is used to first estimate what translucency effect was intended by the translucency settings specified in graphical component 142 (the intended translucency of graphical component 142), as shown on timeline 470 as point 422. In other embodiments, other components with shader functions could also perform this task.

One approach to determining the intended translucency of each pixel of graphical component 142, as used by embodiments, uses the following equation. Inputs to the equation include: the color of the pixel (CP), the translucency or alpha coverage of the pixel (T), the selected color of the first background (Back0) and the selected color of the second background (Back1). In the equations below, two colors are determined (C0, C1) based on the selected background colors (Back0, Back1)

$$C0=CP*T+\text{Back0}*(1-T)$$

$$C1=CP*T+\text{Back1}*(1-T)$$

Neither of the above equations are dependent on the actual background color (CB) 147, which may be unavailable at this time.

As noted above, embodiments described herein may always use black for the first background color (Back0=0) and white for the second background color (Back1=1). In an example where black and white are used for Back0 and Back1 respectively, the equations above simplify to the following equations:

$$C1=CP*T$$

$$C1=CP*T+1-T$$

Once the intended translucency of each pixel is determined, embodiments pause to await the receipt of the actual background color (CB) 147.

As noted above with respect to color selector 220, background colors are selected by embodiments to be maximally different from the other selected background and the color of graphics component 142 color. In embodiments, having this maximal difference increases the accuracy of the linear interpolation.

Background Available

At point 460 on FIG. 4, the actual background (CB) 147 becomes available from background source 145, and the rendering process can proceed. In embodiments, a second linear interpolation is used to complete the rendering. GPU shader 310 performs a second linear interpolation using the above-determined intended translucency values (C0, C1) along with the actual background color (CB) 147 and the two rendered versions of the plug-in, as shown at point 430 on FIG. 4.

One approach to this second linear interpolation used by embodiments, uses the following equation to linearly blend the determined intended translucency of the first background (C0), the determined intended translucency of the second background (C1) and the actual background color (CB) 147:

$$CD=CB*C1+(1-CB)*C0$$

As noted above, embodiments described herein may always use black for the first background color (Back0=0) and white for the second background color (Back1=1). In an example where black and white are used for Back0 and Back1 respectively, the equation above simplifies to the following equation:

$$CD=CP*T+CB*(1-T)$$

Figure 10:
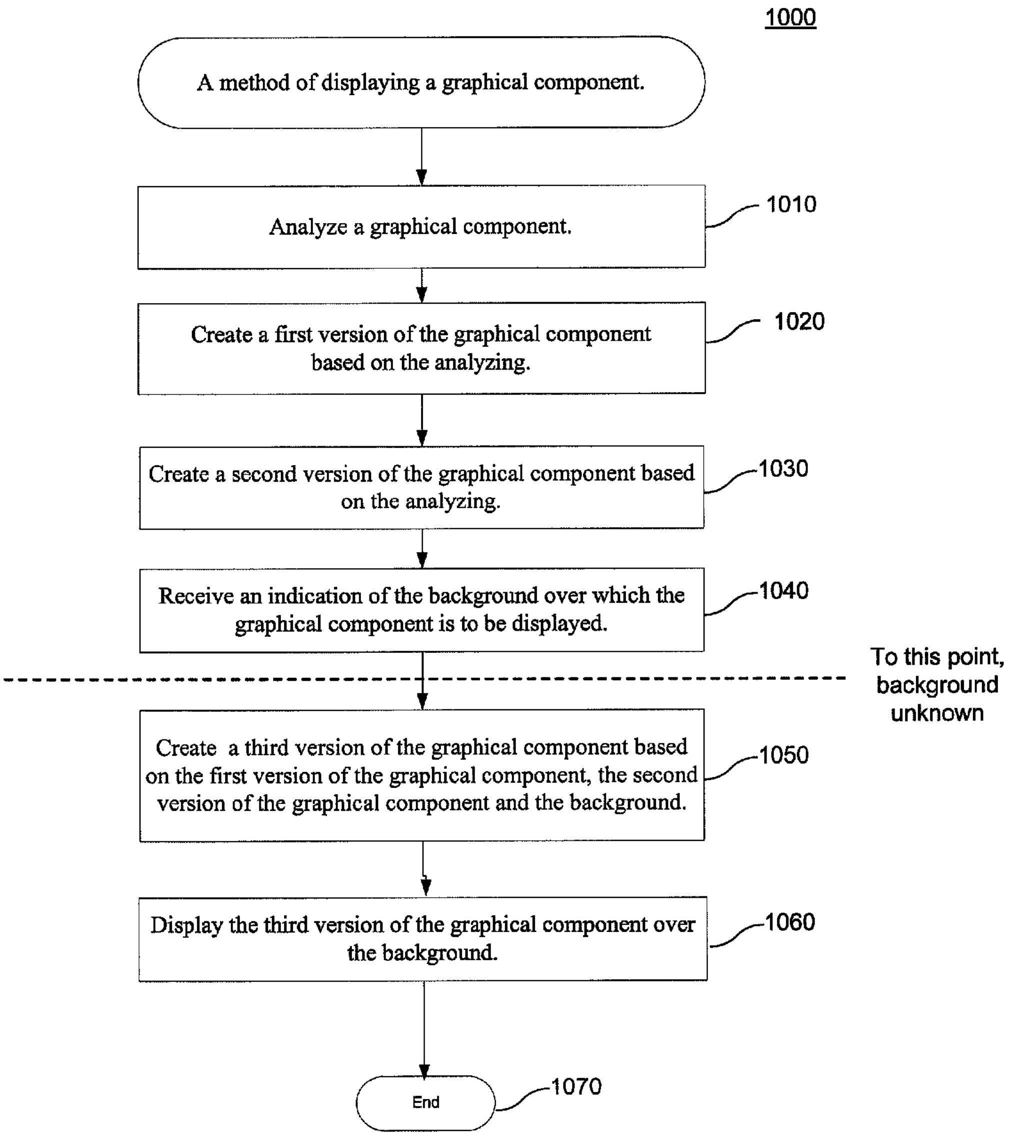
FIG. 10 is a flowchart of a computer-implemented method of displaying a graphical component according to an embodiment.

FIG. 10 illustrates a more detailed view of how compositor 110 may interact with other aspects of embodiments. In this example, initially, as shown in stage 1010, color analyzer 210 analyzes the graphical component 142. In stage 1020, CPU 120 is directed to create a first version of graphical component 142 based on a color selected by color selector 220. In stage 1030, CPU 120 is directed to create a second version of graphical component 142 based on a color selected by color selector 220. In stage 1040, compositor 110 receives an indication of the background over which graphical component 142 is to be displayed. In stage 1050, GPU shader 310 is directed to create a third version of graphical component 142 based on the first version of the graphical component 142, the second version of the graphical component 142 and the background. In the final stage, stage 1060, GPU 130 displays the third version of graphical component 142 over the background on display 150.

II. SUB-PIXEL ANTI-ALIASED TEXT

Figure 5:
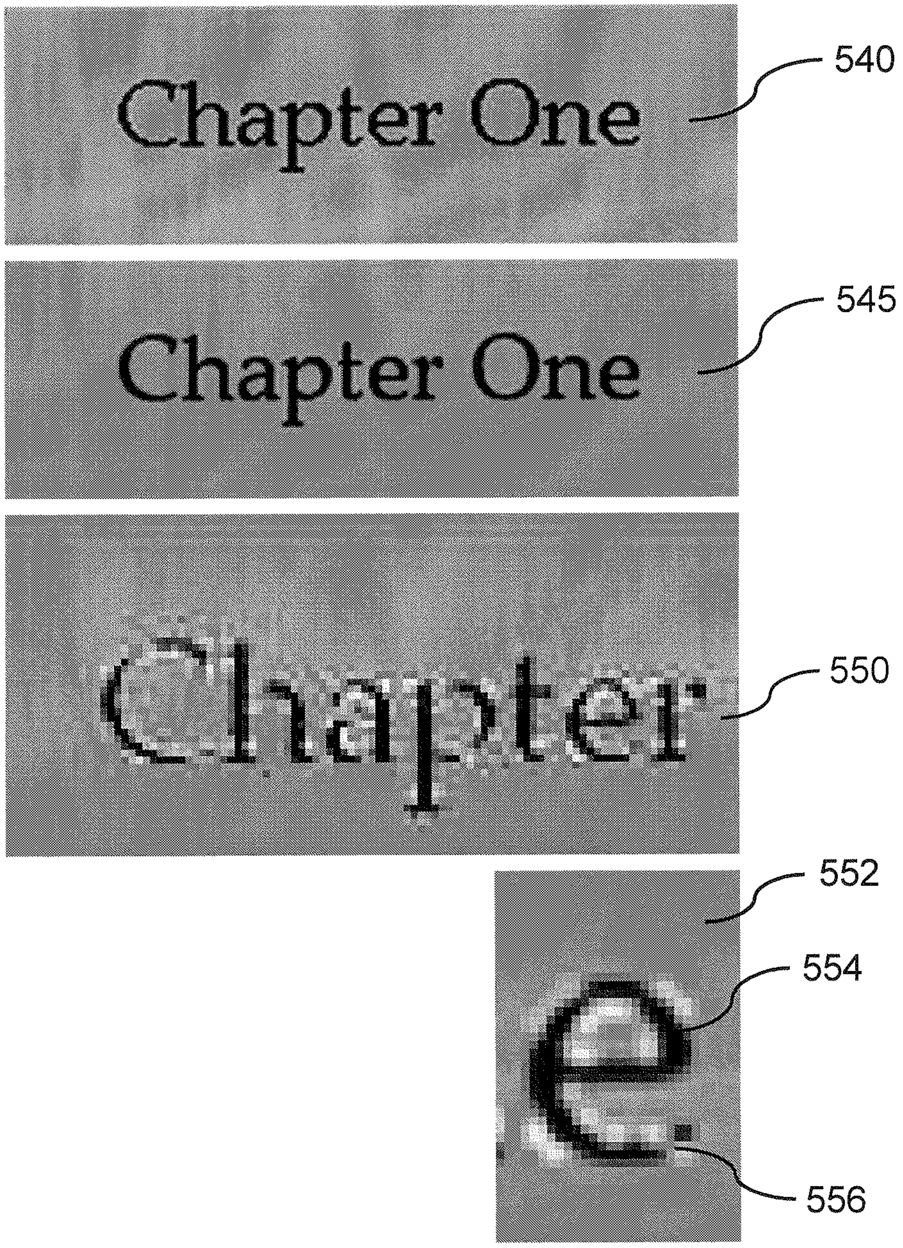
FIG. 5 is a diagram of a graphical object according to an embodiment.

Portions of the approaches described above with embodiments of compositor 110 also may also be used in embodiments to render sub-pixel anti-aliased (SPAA) text over an unknown background. FIG. 5 depicts several examples of text rendering over a background. Text 540 is non anti-aliased text, such text having obvious angular jagged edges where curves in the text are displayed. Text 545 depicts SPAA text, such text using variations in color channels ("sub-pixels"), e.g., red, green and blue, to smooth the curves of the individual letters. As would be apparent to a person skilled in the art given this description, SPAA text is generally rendered using a combination of the text color and the background color upon which it is to be displayed.

Under traditional approaches to SPAA, when the background color is not known at the time the SPAA text is rendered, as depicted in text 550, a "halo" effect 656 may be caused around text 554 and the background 552 upon which the text is rendered. This halo effect 556 reduces or eliminates the advantages of the SPAA process.

Figure 6:
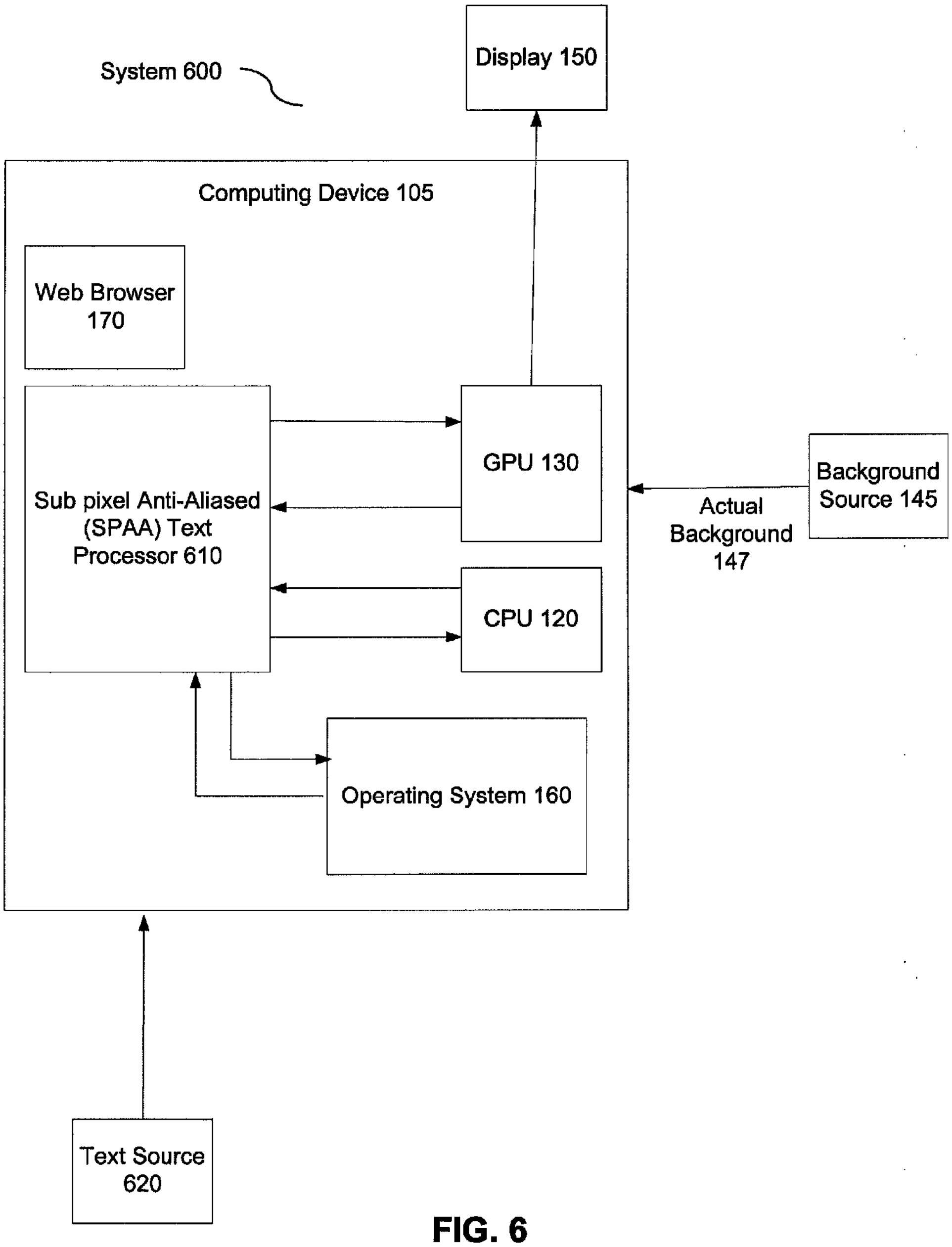
FIG. 6 is a diagram of a system according to an embodiment.

FIG. 6 depicts an embodiment of system 600 including SPAA Text Processor 610, web browser 170, graphics processing unit (GPU) 130 and central processing unit (CPU) 120. In embodiments, computer implemented components can be operated on computing device 105. Embodiments of system 600 also include a text source 620 and a background source 145 coupled to computing device 605.

Computing device 605 can be any commercially available and well known computer capable of performing the functions described herein, such as computers available from International Business Machines, Apple, Sun, HP, Dell, Compaq, Digital, Cray, etc. Computing device 605 also may be a mobile device or other mobile processing system such as a smartphones, mobile phone or tablet personal computer.

Figure 7:
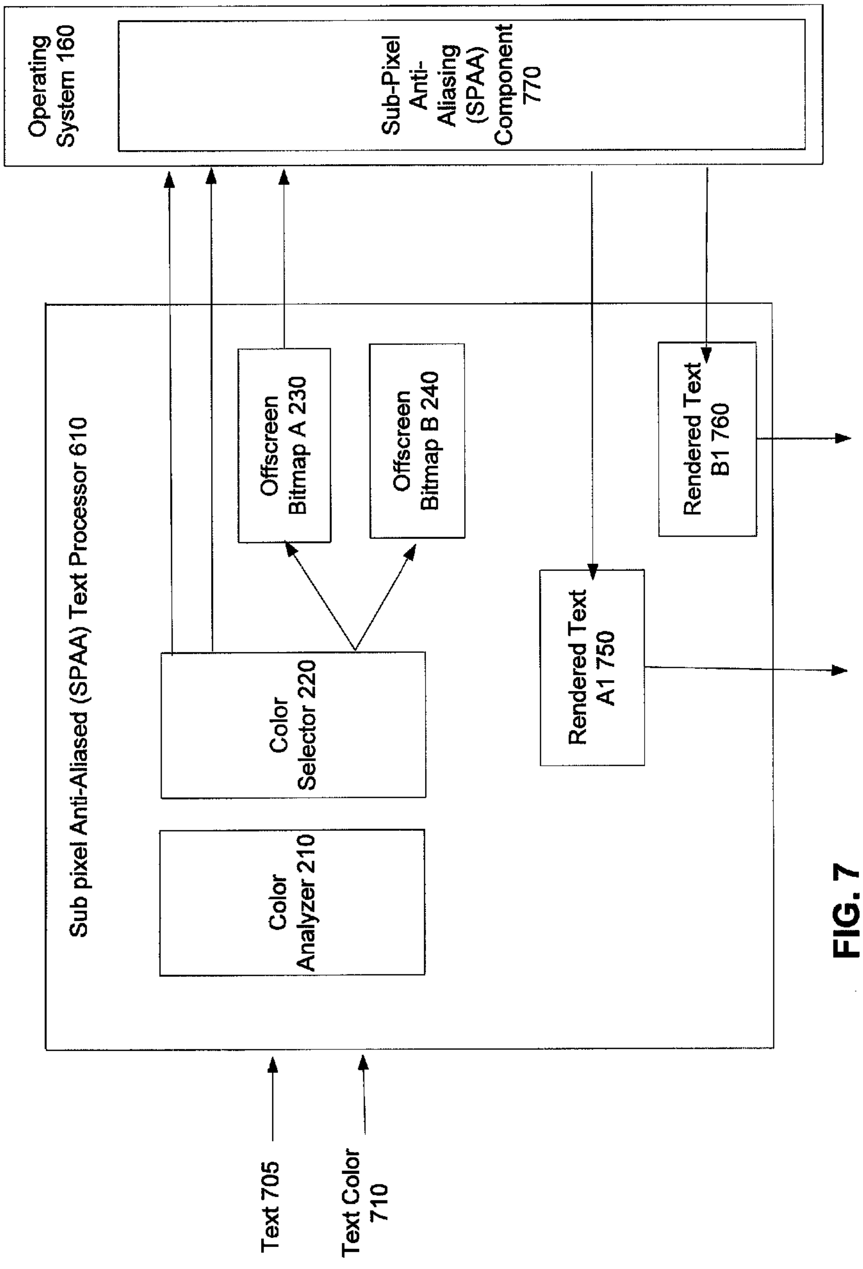
FIG. 7 is a diagram of a sub-pixel anti-aliased text processor according to an embodiment.

FIG. 7 is a more detailed diagram of a SPAA text processor 610 according to an embodiment. In an embodiment, SPAA text processor 610 includes a color analyzer 210, color selector 220, offscreen bitmaps A 230 and B 240, and may store rendered text A 750 and B 760. In an embodiment, SPAA text processor 610 coupled to operating system 160, such operating system containing a Sub-Pixel Anti-Aliasing (SPAA) Component 770.

Broadly speaking, in embodiments, SPAA text processor 610 analyzes and selects colors to allow the composition of SPAA text over a background that is unknown at the time of SPAA rendering.

Figure 8:
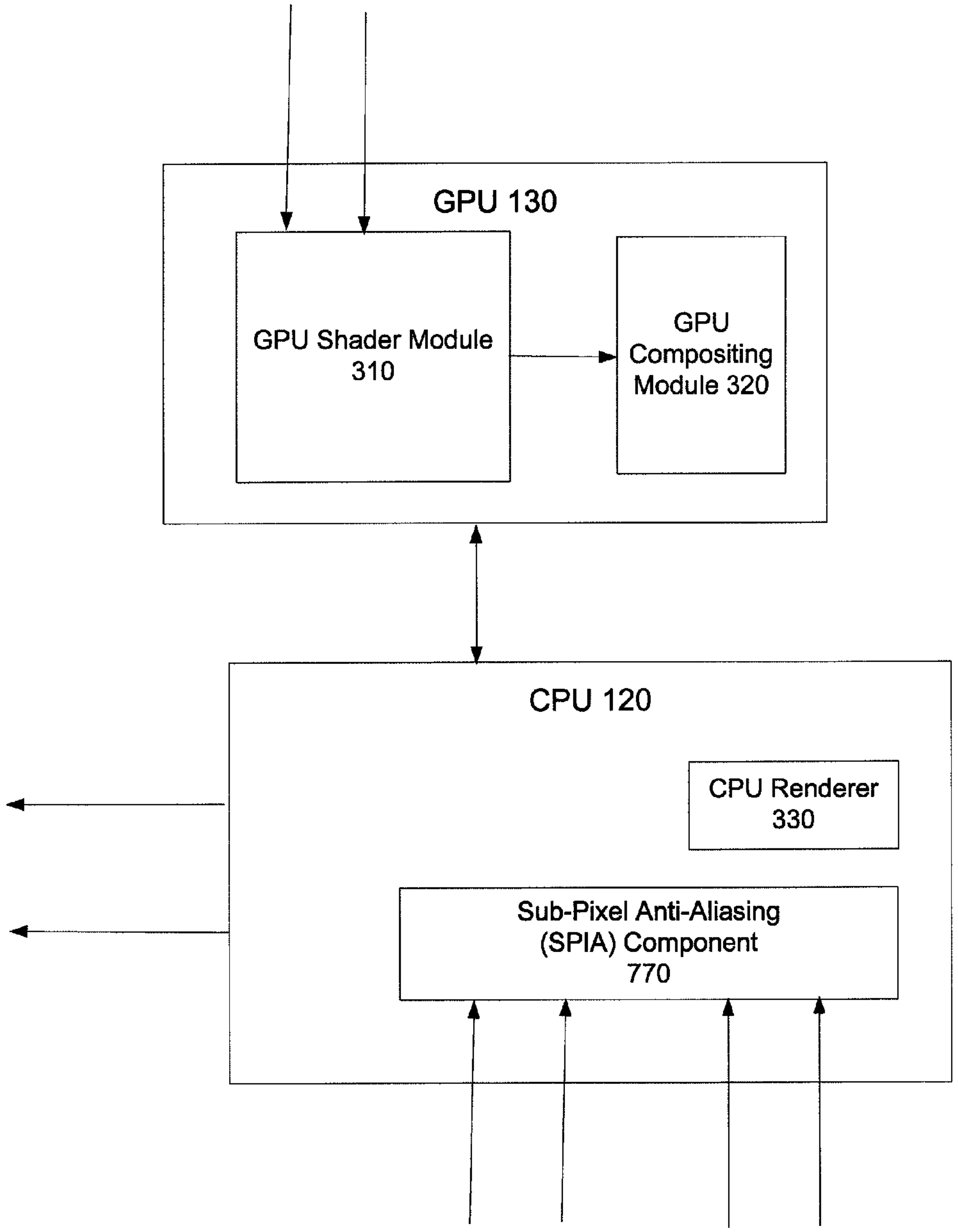
FIG. 8 is a diagram of graphics systems according to an embodiment.

FIG. 8 depicts an embodiment of a graphical display system including GPU 130 coupled to CPU 120. An embodiment includes GPU 130 having GPU shader 310 coupled to GPU renderer 320, and CPU 120 having sub-pixel anti-aliasing (SPIA) component 770.

Figure 9:
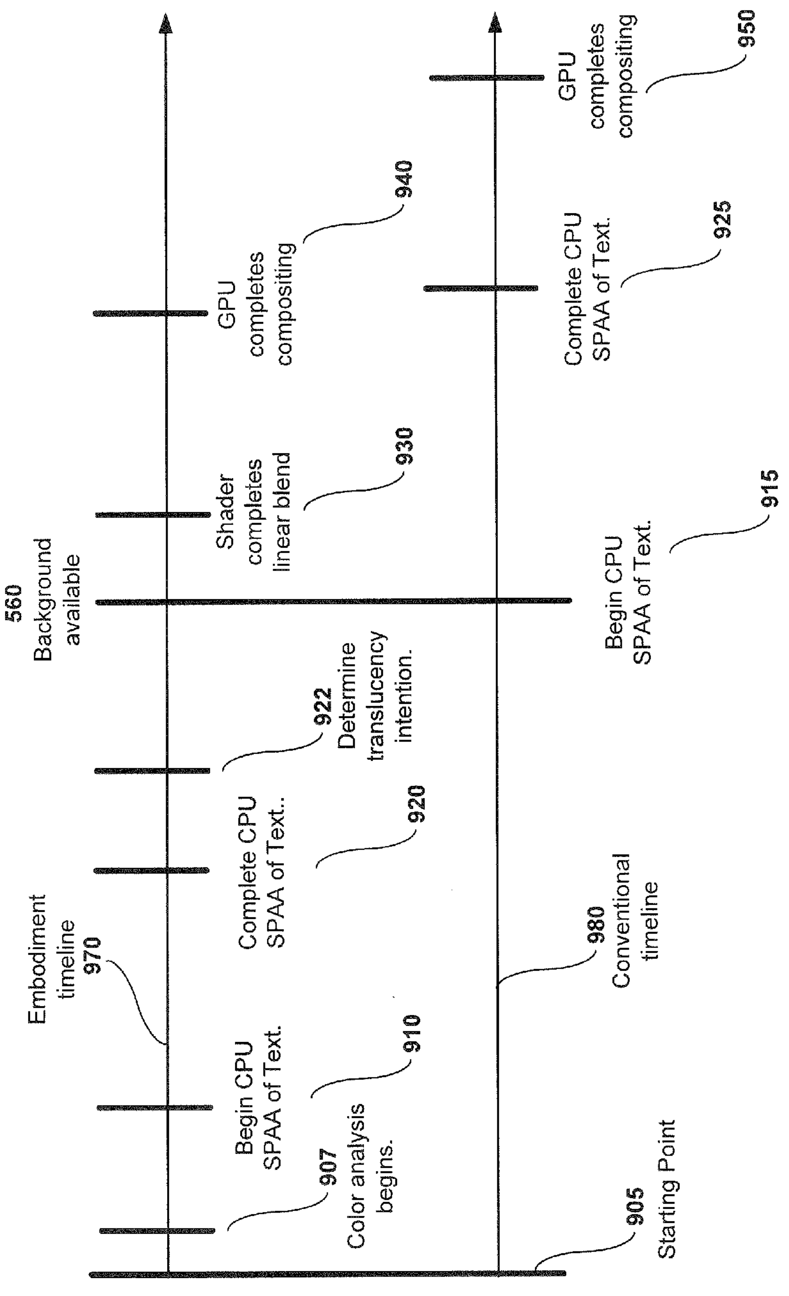
FIG. 9 is a timeline showing events associated with graphical rendering according to an embodiment.

FIG. 9 depicts two timelines of example events according to an embodiment. Timeline 970 depicts events that follow the processes outlined by embodiments, and conventional timeline 980 depicts events according to a traditional approach to SPAA text rendering. Comparing the occurrence of various aspects of the SPAA text rendering process shown on FIG. 9, helps to illustrate the features of embodiments described herein. The event placement, duration, and sequence noted on FIG. 9 are not intended to be limiting or precise, rather they are meant to generally describe the operation of an embodiment and the related sequences of events Color Analysis and Selection Broadly speaking, embodiments herein receive text, analyze the text color, select two or more background colors, render the SPAA text over the two different selected background colors and have a shader approximate how the text should appear over a received third background color that was unknown at the time the text was originally rendered.

In an embodiment, color analyzer 210 can be used to analyze text colors and convey information to color selector 220. Based on the information from color analyzer 210, two background colors are chosen by color selector 220, as shown on point 907 on FIG. 9.

Because SPAA uses all three color channels (sub pixels) for the anti-aliasing process, embodiments described herein analyze, select and determine colors using three-channel color vectors, e.g., color (R, G, B). Embodiments described below will use each channels having a value from zero (0) to one (1), wherein zero corresponds to black and one corresponds to full presentation of the color channel.

One approach to analyzing and selecting colors, used by embodiments of color analyzer 210 and color selector 220, is to consider each channel separately in a three part conditional. In an example analysis and selection equation, the following variables are used:

RT=A value corresponding to the red channel value for the text color.

GT=A value corresponding to the green channel value for the text color.

BT=A value corresponding to the blue channel value for the text color.

TextV=The text color expressed as a vector of the three channel values: (RT, GT, BT)

R0=A value corresponding to the red channel value for the first background color.

G0=A value corresponding to the green channel value for the first background color.

B0=A value corresponding to the blue channel value for the first background color.

Back0V=The first background color expressed as a vector of the three channel values: (R0, G0, B0).

R1=A value corresponding to the red channel value for the second background color.

G1=A value corresponding to the green channel value for the second background color.

B1=A value corresponding to the blue channel value for the second background color.

Back1V=The second background color expressed as a vector of the three channel values: (R1, G1, B1)

In embodiments, the background colors are selected so as to be maximally different from one another. As discussed further below, having this broad difference allows the later steps disclosed to have increased accuracy. An embodiment uses the following logic to approximate these determinations for each channel. The red channel is described below for example, but the same logic is used to select the green and blue channels:

TABLE #2

| Value | R0 Calculation | R1 Calculation |
|---|---|---|
| 0 <= RT < ⅓ | R0 = (RT + 1)/2 | R1 = 1 |
| ⅓ <= RT < ⅔ | R0 = 0 | R1 = 1 |
| ⅔ <=RT <= 1 | R0 = 0 | R1 = RT/2 |

The same determinations from table #2 are performed independently for the green and blue channels. Based on the determination approach shown above, regardless of the RT value, the first background color will be darker than the second background color. Description of the approach shown in Table #1 is not intended to limit the scope of potential embodiments, rather, it is illustrative of an approach that a person, skilled in the art and familiar with the teachings herein, could use to select appropriate background colors for further processing by embodiments described herein.

Using the above example approach, a text color of black (TextV[0, 0, 0]) would yield grey (Back0V[0.5, 0.5, 0.5]) as a first background color, and white (Back1V[1, 1, 1]) as a second background color.

In an embodiment, once the first background color and the second background color are selected, offscreen bitmap A 230 is cleared to a color corresponding to Back0V, and offscreen bitmap A 240 is cleared to a color corresponding to Back1V. These bitmaps 230, 240 may be managed within the compositor 110 component, as shown in FIG. 2, or within any other type of storage.

CPU 120

Embodiments described herein do not perform the actual anti-aliasing of the text, rather the colors are selected and a request is made to an external component, e.g., SPAA component 770, to perform the SPAA, as shown at point 910 on FIG. 9. Other embodiments could include a SPAA function within compositor 110.

In an embodiment, the SPAA process is performed by operating system 160 executed by CPU 120. As would be apparent to a person skilled in the art given this description, one example of a SPAA component 770 is a CLEARTYPE processing module from Microsoft Corp. of Redmond, Wash. CLEARTYPE is a feature of Microsoft GRAPHICS DEVICE INTERFACE (MS GDI). Progammatic access to the CLEARTYPE SPAA in Microsoft WINDOWS operating system can be performed by application programming interface (API) calls to the MS GDI. Other programmatic approaches exist in WINDOWS as well as other operating systems 160. Embodiments described herein could use various types of SPAA component 770.

In an embodiment, offscreen bitmap A 230 is submitted, along with text color 710, and text 705, to SPAA component 770, and rendered text A 750 is received back. Similarly, in an embodiment, offscreen bitmap B 240 is submitted, along with text color 710, and text 705, to SPAA component 770, and rendered text B 760 is received back. Text color 710 could be submitted in any form required by SPAA component 770, and could be submitted once instead of twice, as described above. In embodiments, SPAA component 770 may transfer the above noted 750, 760 rendered text directly to GPU 130 for further processing described below.

In an embodiment, rendered text A 750 and B 760 are SPAA output from SPAA component 770. Rendered text A 750 is text 705 SPAA rendered over the first background color (Back0V in offscreen bitmap A 230), and rendered text B 760 is text 705 SPAA rendered over the second background color (Back1V in offscreen bitmap B 240). In embodiments, the pixel color values returned from SPAA text rendering over the first background (Back0V) and the second background (Back1V) are C0 and C1 respectively.

As would be apparent to a person skilled in the art given this description, in some cases, when SPAA processes are applied to text, the width of the lines that compose the text are dependent on both the color of the text and the color of background it is SPAA rendered over. In an embodiment, by performing the steps described above, operating system 160 chooses the width of the lines and other properties of the rendered text according to its own rules based on: the text 705, text color 710 and the submitted background colors (Back0V and Back1V in offscreen bitmaps A 230 and B 240 respectively).

Normalization

For further processing, embodiments take the SPAA results from the previous step and perform a normalization step. SPAA component 770 does not necessarily return SPAA results as a vector with coverage for each color channel. Embodiments described herein use a normalization step to determine per channel values for the SPAA results for subsequent processing, as shown at point 922 on FIG. 9.

As would be apparent to a person skilled in the art given this description, this normalization step is different from some traditional approaches to SPAA which use a single coverage for the whole pixel. Embodiments described herein treat each color channel (a spatially separate subpixel) independently for processing.

To provide these per channel values, embodiments normalize each pixel of rendered text A 750 and rendered text B 760 to estimate the coverage for each color channel. In embodiments, C0N(R, G, B) is a vector of coverage values for a single pixel that is the result of SPAA of text color vector T(R, G, B) over the first background color, and C1N(R, G, B) is a vector of coverage values for a single pixel that is the result of SPAA of text color vector T(R, G, B) over the second background color.

The normalization process described above may be performed by SPAA component 770 before the rendered text 750, 760 is sent, or this normalization may be performed in GPU 130 by GPU shader 310 along with the steps detailed below. Embodiments may perform this normalization step in either GPU shader 310 or SPAA component 770 depending on which solution yields better performance at the time. As would be apparent to a person skilled in the art given this description, in embodiments, other components may perform this normalization step. Additional variables are used with the variables described above in subsequent processing:

TextCV=The text color expressed as a vector of the three channel values: (RT, GT, BT)

Back0V=The first background color expressed as a vector of the three channel values: (R0, G0, B0).

Back1V=The second background color expressed as a vector of the three channel values: (R0, G0, B0).

C0=The pixel color value returned from SPAA text rendering over the first background (Back0V)

C1=The pixel color value returned from SPAA text rendering over the second background (Back1V)

The following details an example of an approach to per channel normalization that is performed by embodiments:

C0N=Normalized C0

C1N=Normalized C1

$$C0N=(\text{Back}0V-C0)/(\text{Back}0V-\text{Text}CV)$$

$$C1N=(\text{Back}1V-C1)/(\text{Back}1V-\text{Text}CV)$$

GPU Shader 310

After the normalization step, the GPU shader 310 now has per-channel coverage values (C0N, C1N) for the text as though it was rendered over the offscreen background colors Back0V and Back1V.

In an embodiment, for each pixel of the text to be displayed, GPU shader 310 receives the following:

| | |
|---|---|
| The original text color vector | TextCV (R, G, B) |
| First background color vector | Back0V (R, G, B) |
| Second background color vector | Back1V (R, G, B) |
| First background SPAA Color | C0N (R, G, B) (Normalized) |
| Second Background SPAA Color | C1N (R, G, B) (Normalized) |
| The actual background 147 | CBV (R, G, B) |

First Linear Interpolation

At point 460 on FIG. 9, the actual background (CBV) 147 becomes available from background source 145, and the rendering process can proceed. Starting at 460 on FIG. 9, the GPU shader 310 does a linear interpolation between the two selected background colors (Back0V and Back1V) and the actual received color (CBV) 147. In the embodiment, the shader determines what combination of the two colors most closely resembles actual background color 147

Because the SPAA text uses all three channels of the pixels that represent each letter, in an embodiment, this approximation is performed on all three of the color channels separately. In one embodiment, using the first linear interpolation, the following equation represents an approximation of the coverage (A(R, G, B)) as though rendered over color CBV(R, G, B):

A(R, G, B)=Approximation of coverage for each color channel $$A(R)=CB(R)*C1N(R)+(1-CB(R))*C0N(R)$$

$$A(G)=CB(G)*C1N(G)+(1-CB(G))*C0N(G)$$

$$A(B)=CB(B)*C1N(B)+(1-CB(B))*C0N(B)$$

A(R, G, B) is a vector with per-channel coverage values used to blend the text color TextCV(R, G, B) with the background color CBV(R, G, B).

Second Linear Interpolation

In an embodiment, once the coverage value for each color channel A(R, G, B) has been selected, a second linear interpolation is performed by the shader. This second linear interpolation uses the determined coverage values for each channel A(R, G, B) and applies them to each channel of each of the text color TextCV(R, G, B). An example equation for performing this second linear interpolation is as follows:

CDV(R, G, B)=Determined color, produced by applying coverage values to each color channel of the SPAA text.

$$CDV(R)=A(R)*\text{Text}CV(R)+(1-A(R))*CB(R)$$

$$CDV(G)=A(G)*\text{Text}CV(G)+(1-A(G))*CB(G)$$

$$CDV(B)=A(B)*\text{Text}CV(B)+(1-A(B))*CB(B)$$

After GPU shader 310 completes ifs linear blend, as shown at point 930 on FIG. 9, CDV(R, G, B) represents the final color of an individual pixel with text color TextCV(R, G, B) as if it were originally rendered over the actual background CBV(R, G, B) 147.

Translucent SPAA Text

The process above can be applied, by embodiments, to non-translucent SPAA text. Translucent SPAA text can be rendered using substantially the same process, by scaling down coverage A before calculating CDV. If the translucency factor is T, then the following equation would determine the determined color, produced by applying coverage values (with translucency) to each color channel of the SPAA text:

$$CDV=A*Ta*\text{Text}CV+(1-A*T)*CB$$

Figure 11:
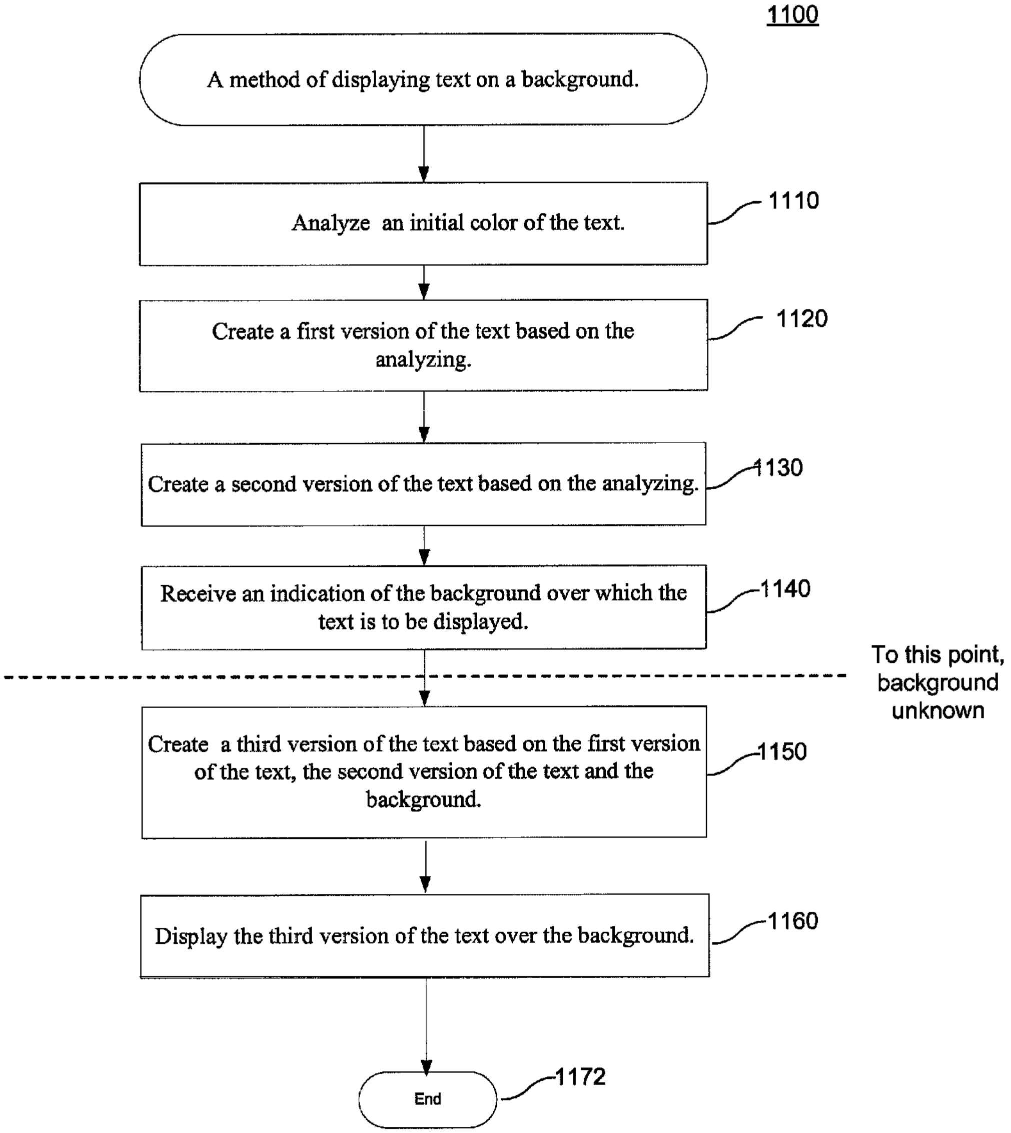
FIG. 11 is a flowchart of a computer-implemented method of displaying text on a background according to an embodiment.

FIG. 11 illustrates a more detailed view of how sub pixel anti-aliased (SPAA) text processor 610 may interact with other aspects of embodiments. In this example, initially, as shown in stage 1110, color analyzer 210 analyzes the text color 710 of received text 702. In stage 1020, CPU 120 is directed to create a first SPAA version of text 702 based on a color selected by color selector 220. In stage 1030, CPU 120 is directed to create a second SPAA version of text 702 based on a color selected by color selector 220. In stage 1040, SPAA text processor 610 receives an indication of the background over which graphical text 702 is to be displayed. In stage 1050, GPU shader 310 is directed to create a third version of text 702 based on the first version of text 702, the second version of the text 702 and the background. In the final stage, stage 1060, GPU 130 displays the third version of text 702 over the background on display 150.

III. EXAMPLE COMPUTER SYSTEM IMPLEMENTATION

Systems 100 and 600, and associated modules, stages, processes and methods described in embodiments described herein for processing text and graphics, may be implemented by software, firmware, hardware, or a combination thereof. Hardware, software or any combination of such may embody any of the depicted components in FIGS. 1-3, 6-8 and any stage in FIGS. 10 and 11.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

Figure 12:
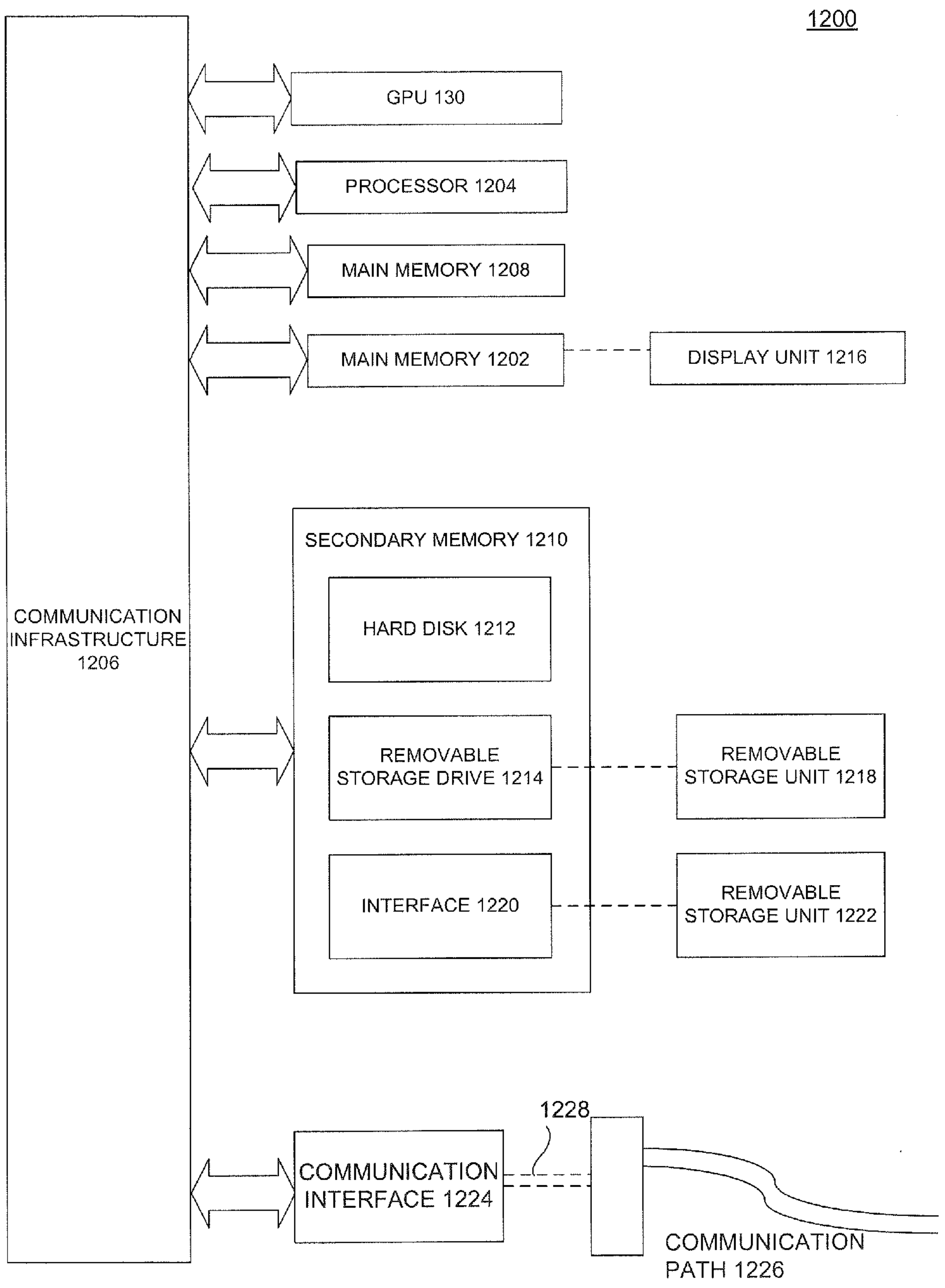
FIG. 12 depicts a sample computer system that may be used to implement one embodiment.

For instance, at least one processor device and a memory may be used to implement the above described embodiments. A processor device may be a single processor, a plurality of processors, or combinations thereof. Processor devices may have one or more processor 'cores.' FIG. 12 illustrates an example computer system 1200 in which embodiments described herein, or portions thereof, may be implemented as computer-readable code. For example, compositor 120 of FIG. 1, carrying out stages of method 1000 of FIG. 10, and system 600 of FIG. 6 carrying out stages of method 1100 of FIG. 11, may be implemented in computer system 1200. Various embodiments described herein are described in terms of this example computer system 1200. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Computer system 1200 includes one or more processor devices, such as processor device 1204, CPU 120 and GPU 130. Processor device 1204 may be a special purpose or a general purpose processor device. As will be appreciated by persons skilled in the relevant art, processor device 1204 may also be a single processor in a multi-core/multiprocessor system, such system operating alone, or in a cluster of computing devices operating in a cluster or server farm. Processor device 1204 is coupled to a communication infrastructure 1206, for example, a bus, message queue, network or multi-core message-passing scheme.

Computer system 1200 also includes a main memory 1208, for example, random access memory (RAM), and may also include a secondary memory 1210. Secondary memory 1210 may include, for example, a hard disk drive 1212 and/or a removable storage drive 1214. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art, removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 may be in the form of signals, which may be electronic, electromagnetic, optical, or other signals capable of being received by communications interface 1224. These signals may be provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Computer program medium and computer usable medium may also refer to memories, such as main memory 1208 and secondary memory 1210, which may be memory semiconductors (e.g. DRAMs, etc.).

Computer programs (also called computer control logic) are stored in main memory 1208 and/or secondary memory 1210. Computer programs may also be received via communications interface 1224. Such computer programs, when executed, enable computer system 1200 to implement the embodiments as discussed herein. In particular, the computer programs, when executed, enable processor device 1204 to implement the processes of embodiments, such as the stages in the method illustrated by flowchart 1000 of FIG. 10 discussed above. Accordingly, such computer programs represent controllers of the computer system 1200. Where embodiments are implemented using software, the software may be stored in a computer program product and loaded into computer system 1200 using removable storage drive 1214, interface 1220, hard drive 1212 or communications interface 1224.

Embodiments may also be directed to computer program products comprising software stored on any computer useable medium. Such software, when executed in one or more data processing device, causes a data processing device(s) to operate as described herein. Embodiments can employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

IV. CONCLUSION

Embodiments described herein provide methods and apparatus for the composition of text and translucent graphical components over a background. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of displaying a graphical component, comprising:

analyzing the graphical component, wherein at the time of the analyzing, a background over which the graphical component is to be displayed is unknown;

creating, while the background over which the graphical component is to be displayed is unknown, a first version of the graphical component based on the analyzing;

creating, while the background over which the graphical component is to be displayed is unknown, a second version of the graphical component based on the analyzing, wherein the first and the second version are different;

receiving an indication of the background over which the graphical component is to be displayed;

creating a third version of the graphical component based on the first and second versions of the graphical component and the background; and displaying the third version of the graphical component.

2. The method of claim 1, wherein the creating the first version of the graphical component based on the analyzing comprises:

selecting a first color based on a color of the graphical component, and rendering the graphical component over the first color as a first background color to create the first version of the graphical component; and creating the second version of the graphical component based on the analyzing comprises:

selecting a second color based on the selected first color and the color of the graphical component, and rendering the graphical component over the second color as a second background color to create the second version.

3. The method of claim 2, wherein one of the first color and the second color is black, and one of the first color and the second color is white.

4. The method of claim 1, wherein creating a third version of the graphical component based on the first version of the graphical component, the second version of the graphical component and the background comprises:

using a graphical processing unit (GPU) to determine an output color of a pixel of the graphical component, the determining being based on the first version of the graphical component, the second version of the graphical component and the background.

5. The method of claim 1, wherein creating both the first version of the graphical component and the second version of the graphical component is performed using a central processing unit (CPU), and wherein creating the third version of the graphical component is performed using a graphical processing unit (GPU).

6. The method of claim 1, wherein after the commencement of the analyzing, the graphical component is not allowed to change until the creating a second version of the graphical component step has completed.

7. The method of claim 1, wherein the graphical component has at least one pixel designated as having translucent display characteristics.

8. A graphical component processor apparatus for compositing a graphical component over a background, comprising:

a) a color analyzer that is configured to receive and analyze the graphical component, wherein at the time of the analyzing, the background over which the graphical component is to be composited is unknown;

b) a color selector that is configured to select a first color and a second color based on the analyzing of the graphical component;

c) a central processing unit (CPU) configured to receive the first color, the second color and the graphical component, wherein the central processing unit is configured to, while the background over which the graphical component is to be composited is unknown, render a first version of the graphical component using the first color, and a second version of the graphical component using the second color, wherein the first and the second versions are different; and d) a graphical processing unit (GPU) configured to, upon the availability of the background over which the graphical component is to be composited, composite the graphical component using the first version of the graphical component, the second version of the graphical component and the background.

9. A method of displaying text on a background, comprising:

analyzing an initial color of the text, wherein at the time of the analyzing the background is not known;

creating, while the background over which the graphical component is to be displayed is unknown, a first version of the text based on the analyzing;

creating, while the background over which the graphical component is to be displayed is unknown, a second version of the text based on the analyzing, wherein the first and the second versions are different;

receiving an indication of a background over which the text is to be displayed;

creating a third version of the text based on the first version of the text, the second version of the text and the background; and displaying the third version of the text.

10. The method of claim 9, wherein the creating a first version of the text based on the analyzing comprises: selecting a first color based on the initial color of the text and rendering the text with the first color as the background to create the first version; and wherein the creating a second version of the text based on the analyzing comprises: selecting a second color based on the first color and the initial color of the text; and rendering the text with a second color as the background to create the second version.

11. The method of claim 10, wherein the creating a first version of the text based on the analyzing comprises: rendering the text, by an operating system of the computer, into subpixel antialiased text having properties determined by the operating system of the computer; and wherein the creating a second version of the text based on the analyzing comprises: rendering the text, by the operating system of the computer, into subpixel antialiased text having properties determined by the operating system of the computer.

12. The method of claim 11, wherein creating a third version of the text based on the first version of the text, the second version of the text and the background comprises:

linearly blending between the first version of the text and the second version of the text based on a color of the background over which the text is to be displayed to produce the third version, wherein the third version of the text is subpixel antialiased text and the blending is performed for each color channel of each pixel.

13. The method of claim 11, wherein the rendered subpixel antialiased first and second versions have per channel coverage values for each channel of each pixel of the version.

14. The method of claim 11, wherein the text has translucent properties, and the creating a third version of the text further comprises, creating a third version of the text based on the first version of the text, the second version of the text, the background and a translucency factor of the text.

15. The method of claim 10, wherein the selecting a first color based on the initial color of the text comprises, selecting a first color that differs maximally from the color of the text; and the selecting a second color based on the first color and the initial color of the text comprises, selecting a second color that differs maximally from both the color of the text and the selected first color.

16. The method of claim 9, wherein creating a third version of the text based on the first version of the text, the second version of the text and the background comprises:

linearly blending between the first version of the text and the second version of the text based on a color of the background over which the text is to be displayed to produce the third version of the text.

17. The method of claim 9, Wherein the first and second versions of the text are created by a CPU and the third version is created by a GPU.

18. A text processor apparatus for compositing subpixel antialiased text over a background, comprising:

a) a color analyzer that is configured to receive and analyze a color of the text, wherein at the time of the analyzing, the background over which the text is to be displayed is unknown;

b) a color selector that is configured to select a first color and a second color based on the analyzing of the color of the text; and c) a central processing unit (CPU) configured to receive the first color, the second color and the color of the text, wherein the central processing unit is configured to render a first version of the text using the first color, and a second version of the text using the second color, wherein the first and the second versions are subpixel antialiased text; and d) a graphical processing unit (GPU) configured to, upon the availability of a background over which the text is to be composited, composite the text using the first version of the text, the second version of the text and a color of the background.

19. The apparatus of claim 18, wherein the CPU is configured to composite the text by a process comprising a linear blending between the first version of the text and the second version of the text based on a color of the background over which the text is to be displayed, the blending producing a blended subpixel antialiased text version, wherein the blending is performed for each color channel of each pixel.

20. The apparatus of claim 18, wherein the CPU is configured to render both the first version and the second version as having a value for the coverage area of each color channel of each pixel.

21. A method of displaying a graphical component, comprising:

receiving the graphical component;

analyzing the graphical component, wherein at the time of the analyzing, a background over which the graphical component is to be displayed is unknown;

receiving a first version of the graphical component from a first processing unit based on the analyzing;

receiving a second version of the graphical component from the first processing unit based on the analyzing, wherein the first and the second versions are different;

receiving an indication of the background over which the graphical component is to be displayed;

receiving a third version of the graphical component from a second processing unit based on the first version of the graphical component, the second version of the graphical component and the background; and transmitting the third version of the graphical component to a display.

* * * * *

UNITED STATES PATENT AND TRADEMARK OFFICE

CERTIFICATE OF CORRECTION

PATENT NO. : 8,611,646 B1
APPLICATION NO. : 12/717556
DATED : December 17, 2013
INVENTOR(S) : Alastair Patrick It is certified that error appears in the above-identified patent and that said Letters Patent is hereby corrected as shown below:

In the Claims:

<u>Column 18, Line 65</u>
Please replace “Wherein the first” with --wherein the first--.

Signed and Sealed this
Eighteenth Day of March, 2014

Michelle K. Lee
*Deputy Director of the United States Patent and Trademark Office*